(12) United States Patent
Rosen

(10) Patent No.: US 6,581,846 B1
(45) Date of Patent: Jun. 24, 2003

(54) THERMOSTAT INCLUDING A VACATION MODE IN WHICH ELECTRICAL DEVICES WITHIN AND PROXIMATE THE CONDITIONED SPACE ARE OPERATED BY THE THERMOSTAT TO PROVIDE AN OCCUPIED APPEARANCE

(76) Inventor: Howard B. Rosen, 1 Lyncroft Road, Hampstead, PQ (CA), H3X 3E3

( * ) Notice: Subject to any disclaimer, the term of this patent is extended or adjusted under 35 U.S.C. 154(b) by 0 days.

(21) Appl. No.: 10/091,757

(22) Filed: Mar. 6, 2002

(51) Int. Cl.[7] ............................ F23N 5/20; G05D 23/00
(52) U.S. Cl. ................................... 236/46 R; 165/238
(58) Field of Search ......................... 236/46 R, 94, 236/47; 165/238, 11.1; 700/276; 116/7; 315/129

(56) References Cited

U.S. PATENT DOCUMENTS 4,780,872 A * 10/1988 Masuda et al. ............... 370/92
5,927,598 A * 7/1999 Broe .......................... 236/46 R
6,285,912 B1 * 9/2001 Ellison et al. ................. 700/11

* cited by examiner

Primary Examiner—William Wayner

(57) ABSTRACT

A thermostat system for controlling space conditioning equipment includes a temperature sensor for providing an electrical signal indicative of the temperature of a conditioned space and a processor having a central processing unit, a memory for storing program and data information and an input/output unit. The input/output unit has a temperature sensor input, a control output sending control signals to the space conditioning equipment and also an electrical device interface adapted to establish communications between the processor and a plurality of addressable electrical devices. In operation, when the system is in a vacation mode the processor issues a pattern of commands to the devices to provide the illusion of ongoing occupancy. In one preferred embodiment, communications between the processor and the devices takes place over the local line power system. In another preferred embodiment, the processor sends commands via infrared to an electrical device controller which resends the commands over the local line power system to the devices.

15 Claims, 5 Drawing Sheets

US 6,581,846 B1

THERMOSTAT INCLUDING A VACATION MODE IN WHICH ELECTRICAL DEVICES WITHIN AND PROXIMATE THE CONDITIONED SPACE ARE OPERATED BY THE THERMOSTAT TO PROVIDE AN OCCUPIED APPEARANCE

FIELD OF THE INVENTION

This invention relates to the art of thermostats and, more particularly, to a thermostat system having a "vacation" mode of operation in which the environment of a space supervised by the thermostat system is maintained at energy-saving levels while the space is unoccupied. More particularly, this invention relates to such a thermostat system which, when operating in "vacation" mode, issues commands to various devices situated in and around the conditioned space to provide an appearance of ongoing occupancy.

BACKGROUND OF THE INVENTION

Thermostats have been used for many years as temperature sensitive devices which controls heating and/or cooling equipment for conditioning a space in which the thermostat, or a temperature sensor connected to a thermostat, is placed. In the well known manner, a simple thermostat can be adjusted to establish a temperature set point such that, when the temperature in the conditioned space reaches the set point, the thermostat interacts with the heating and/or/cooling equipment to take suitable action to heat or cool the conditioned space as may be appropriate for the season and conditions.

Modern thermostat systems, which take advantage of the ongoing rapid advances in electronic technology and circuit integration, have many features which provide more precise supervision of the heating and/or cooling equipment to achieve more economical and more comfortable management of the temperature of a conditioned space. Many modern thermostat systems include a real time clock, a memory and a data processor to run a process control program stored in the memory to accurately measure the temperature of a temperature sensor disposed in the conditioned space and to send control signals to the heating and/or cooling equipment to closely control the temperature of the conditioned space. Modem thermostat systems permit anticipating and minimizing hysterisis or overshoot of the temperature in the conditioned space. In addition, the program can specify different set points at different times of the day and week and may also include a "vacation" mode which employs different set points when the conditioned space is not occupied for an extended period.

Many modern thermostat systems are programmable by a user by selectively placing the process control program into a programming mode. Typically, prior art programmable thermostat system employ a tactile touch pad with various fixed position buttons to be touched in a precise sequence to program set points (which may vary with the day of the week) for programmable time periods which may include a "vacation mode". The programming sequence may be followed on a separate display, typically a liquid crystal display.

When a thermostat system is placed into the "vacation mode" in contemplation of the conditioned space being unoccupied for a period, there may be a concurrent desire, for security reasons, to establish a pattern for actuating and deactuating various electrical devices in and around the conditioned space to provide an indication that the space remains occupied. The present thermostat system integrates these tasks in a highly convenient, efficient and effective manner.

SUMMARY OF THE INVENTION

Briefly, a thermostat system for controlling space conditioning equipment includes a temperature sensor for providing an electrical signal indicative of the temperature of a conditioned space and a processor having a central processing unit, a memory for storing program and data information and an input/output unit. The input/output unit has a sensor input coupled to the temperature sensor, a control output sending control signals to the space conditioning equipment and also an electrical device interface adapted to establish communications between the processor and a plurality of addressable electrical devices situated within and proximate the conditioned space. In operation, when the system is in a vacation mode the processor issues a pattern of actuate and deactuate commands to the addressable electrical devices to provide the illusion of ongoing occupancy. In one preferred embodiment, communications between the processor and the electrical devices takes place over the local line power system, for example, in accordance with the X10 protocol. In another preferred embodiment, the processor sends commands via infrared to an electrical device controller which resends the commands over the local line power system to the electrical devices.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DESCRIPTION OF THE PREFERRED EMBODIMENTS

Figure 1:
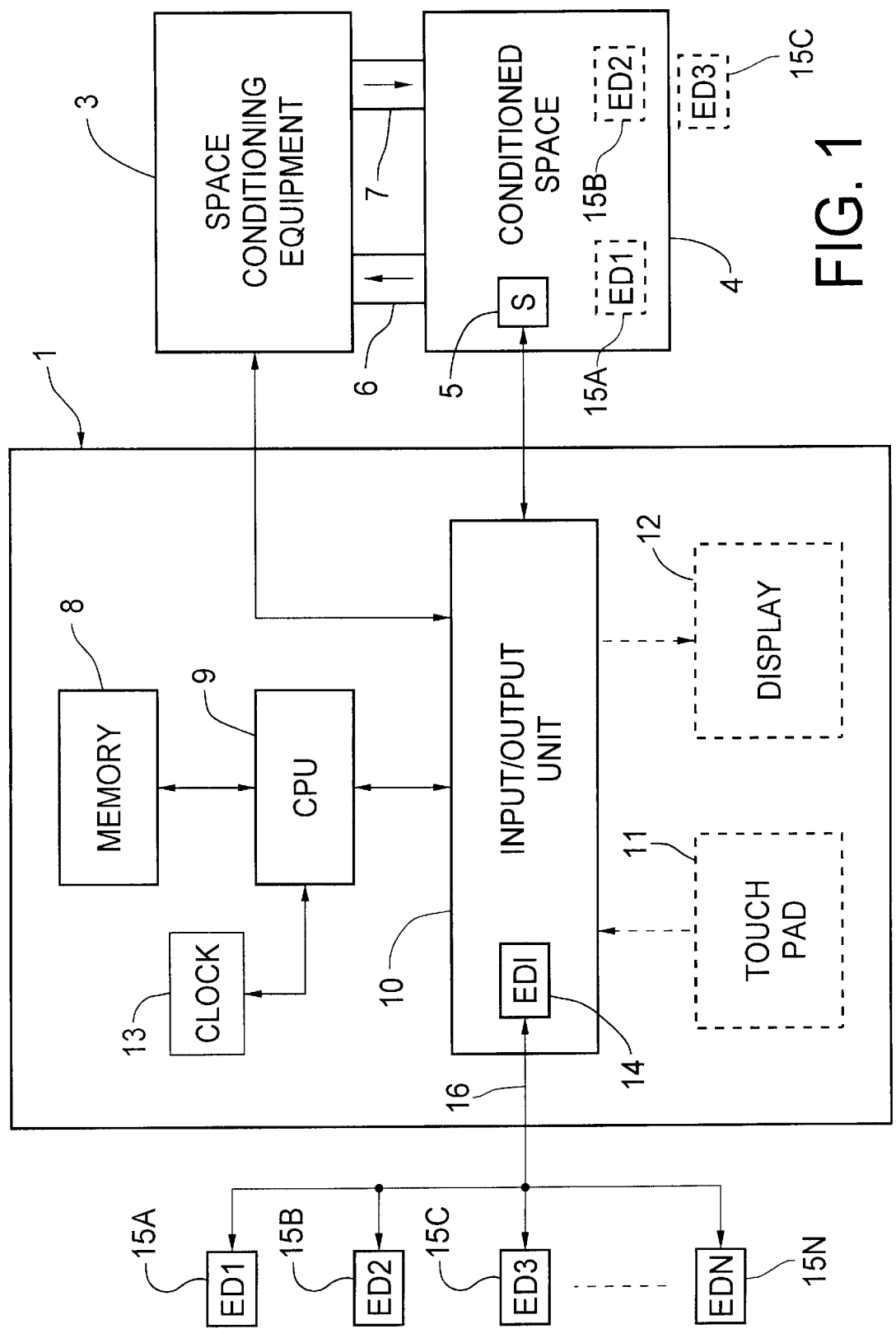
FIG. 1 is a block diagram of a first embodiment of a thermostat system employing the present invention.

Referring first to FIG. 1, a thermostat system includes a processor 1 and a temperature sensor 5 which is disposed in a conditioned space 4. The processor 1 and the sensor 5 may be situated in a common housing (not shown) or separated, all as very well known in the art. The common housing is usually, but not necessarily, placed in the conditioned space 4. Thus, those skilled in the art will understand that the block diagram of FIGS. 1–4 are very general in order to best explain the invention.

The processor 1 includes a central processing unit (CPU) 9 in communication with a memory 8 which stores data and program information and also, via an input/output unit (I/O unit) 10, a touch pad 11 and a display 12. The touchpad 11 can include one or more user-actuable switches in any suitable form for manually entering information into the processor 1. The display 12 can be as simple as one or more indicator lights (typically, light emitting diodes—LEDs) or as elaborate as a full alphanumeric liquid crystal display (LCD).

The memory 8 may include a read-only part which is factory-programmed and a random-access part which stores data subject to change during operation. A settable real time clock 13 is used to keep time in the thermostat system to facilitate diverse operations, such as different temperature set points (desired temperatures), during different periods of the day cycle. The thermostat system may be suitably powered by a battery (not shown) and/or from equipment to which is connected. The I/O unit 10 includes an electrical device interface 14 for coordinating communications between the CPU 9 and one or more electrical devices 15. The electrical device interface 14 may be, for example, a conventional serial port coupled to electrical devices via a data transfer medium (e.g., a cable) 16.

Thus, in the usual manner during normal operation, the temperature sensor 5 sends an electrical signal (e.g., if the sensor 5 is a simple thermistor, a resistance value; several types of temperature sensors are widely used) representative of the temperature within the conditioned space 4. The processor can convert the resistance value to a digital value (using a conventional internal analog-to-digital converter, not shown) and compare this digital value against a previously entered set point, stored as a digital value, to determine if control signals need to be sent to the space conditioning equipment 3.

For example, if the temperature in the conditioned space 4 is found to be too low when operation is in the heating mode, the processor 1 signals the space conditioning equipment 3 to circulate, through ducts 6, 7, air from/to the conditioned space 4 which is heated by the space conditioning equipment before return to the conditioned space. This heating phase continues until the sensor 5 indicates that the space is now too hot (or approaching too hot) with reference to the set point such that the processor 1 sends signals to the space conditioning equipment 3 to cease the heating function, all as very well known in the art. In a cooling mode, a counterpart procedure is followed. Those skilled in the art will understand that the control process typically includes such refinements as anticipation, hysterisis accommodation, fan control, etc. which are acknowledged, but are not directly relevant to the subject invention.

It may be noted that integrated circuit chips including all the processor components with all the necessary interface conditioning circuits are available off-the-shelf and are under constant refinement for increased power. The subject invention only requires the capabilities of such a processor such that off-the-shelf integrated circuit processor chips may be used to advantage in the subject thermostat system.

Still referring to FIG. 1, electrical devices 15A, 15B, 15C, 15N (as many as may be provided in a given installation) may be of diverse types used in home automation, security, entertainment, etc. One widely-used series of such devices incorporate the X10 protocol, and an X10-based system will be referenced to explain the invention. Many types of home automation and security electrical devices using the X10 protocol are available off-the-shelf from various suppliers. Such devices include wall receptacles, light controllers, wall switches, motion detectors, door locks, video surveillance devices, wireless receivers and transmitters, etc., etc.

It is well known in the art that electrical devices in X10 systems communicate at very low power via the local power system such as ordinary house wiring in a dwelling. X10 devices are set to individual electronic addresses, and more than one device can have the same address and will respond alike to a digital command placed on the local power system by a controller. Basic X10 devices respond to "on/off" commands (although there is provision in the X10 protocol for more complex operation of more elaborate devices). For example, several X10 operated lights in a given room may have the same address such that a command placed on the local power system to turn on devices with that selected address will turn on all the lights.

Because the invention can be explained by referencing a very simple system, it is assumed in the example that: ED1 15A is a group of light modules having the same address and disposed in a room, e.g., a kitchen, within the conditioned space 4; ED2 15B is a single light module disposed within the conditioned space 4 near a main entry door (not shown); and ED3 15C is a light module situated outside the conditioned space 4 proximate the main entry door.

Figure 5:
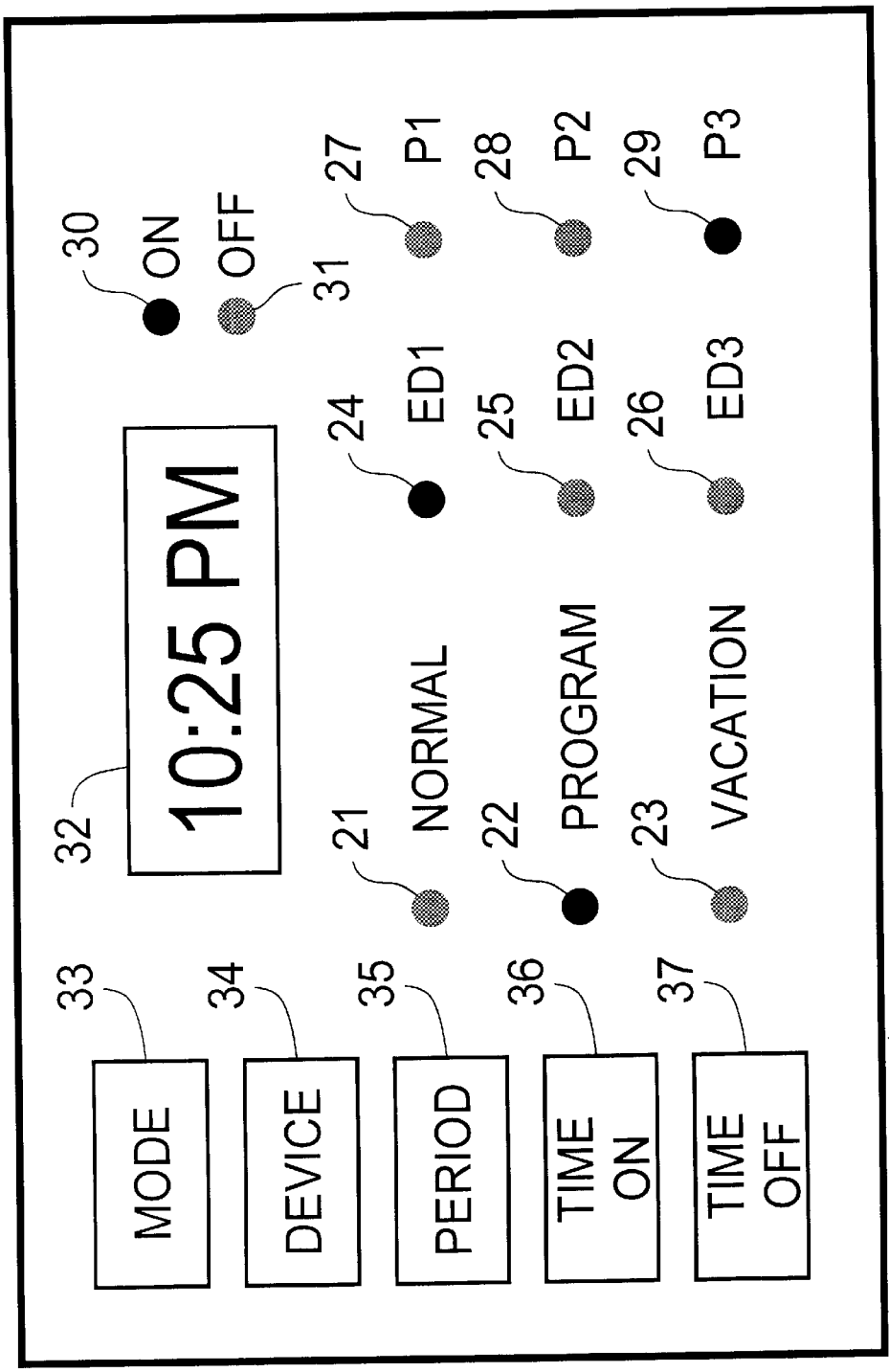
FIG. 5 is a pictorial of a simplified exemplary control panel which may be employed in the use of the invention.

With reference to the exemplary panel 22 (combining the touch pad 11 and display 12) shown in FIG. 5, it is further assumed in the simple example that three on/off periods in a day can be programmed for any electrical device and that the various current states of the system are indicated by LEDs 21–31, the set point time (during programming) is indicated by an LCD 32 and user entry is via switch buttons 33–37. (It will be understood that the panel 22 of FIG. 5 is shown and discussed only for ease of explaining the invention. Commercial embodiments of the invention may incorporate more fully designed and elegant refinements in various configurations in a plurality of models.)

Actuating the mode switch 33 successively steps through the modes: "normal" (LED 21 lit), "program" (LED 22 lit) and "vacation" (LED 23 lit). In FIG. 5, the system is in the "program" mode. Actuating the "device" switch 33 successively steps through the devices ED1, ED2 and ED3 for individual programming. In FIG. 5, ED1 has been selected as indicated by the LED 24. Actuating the "period" switch 35 has selected period 3 as indicated by the LED 29. Selectively holding the "time on" switch 36 (LED 30 lit) cycles the clock readout shown in the LCD 32 to set the start time of period 3 for ED1. Subsequently, selectively holding the "time off" switch 37 (LED 31 lit) will cycle the clock readout shown in the LCD 32 to set the end time of period 3 for ED1 15A. The "on" and "off" periods for ED2 15B and ED3 15C are similarly set.

As an example, assume that: ED1 15A has been set to have three "on" periods of 6:30–7:30 PM (P1), 10:00–10:25 PM (P2) and 5:30–8:00 AM (P3); ED2 15B has been set to have two "on" periods of 7:00–10:30 PM (P1) and 6:30–8:00 AM (P2); and ED3 15C has been set to have a single "on" period of 7:00–11:30 PM. Thus, when the system is in vacation mode, the various lights will cycle in a manner consistent with the conditioned space being occupied and according to their individual placements to provide a deterrent to mischief.

Figure 2:
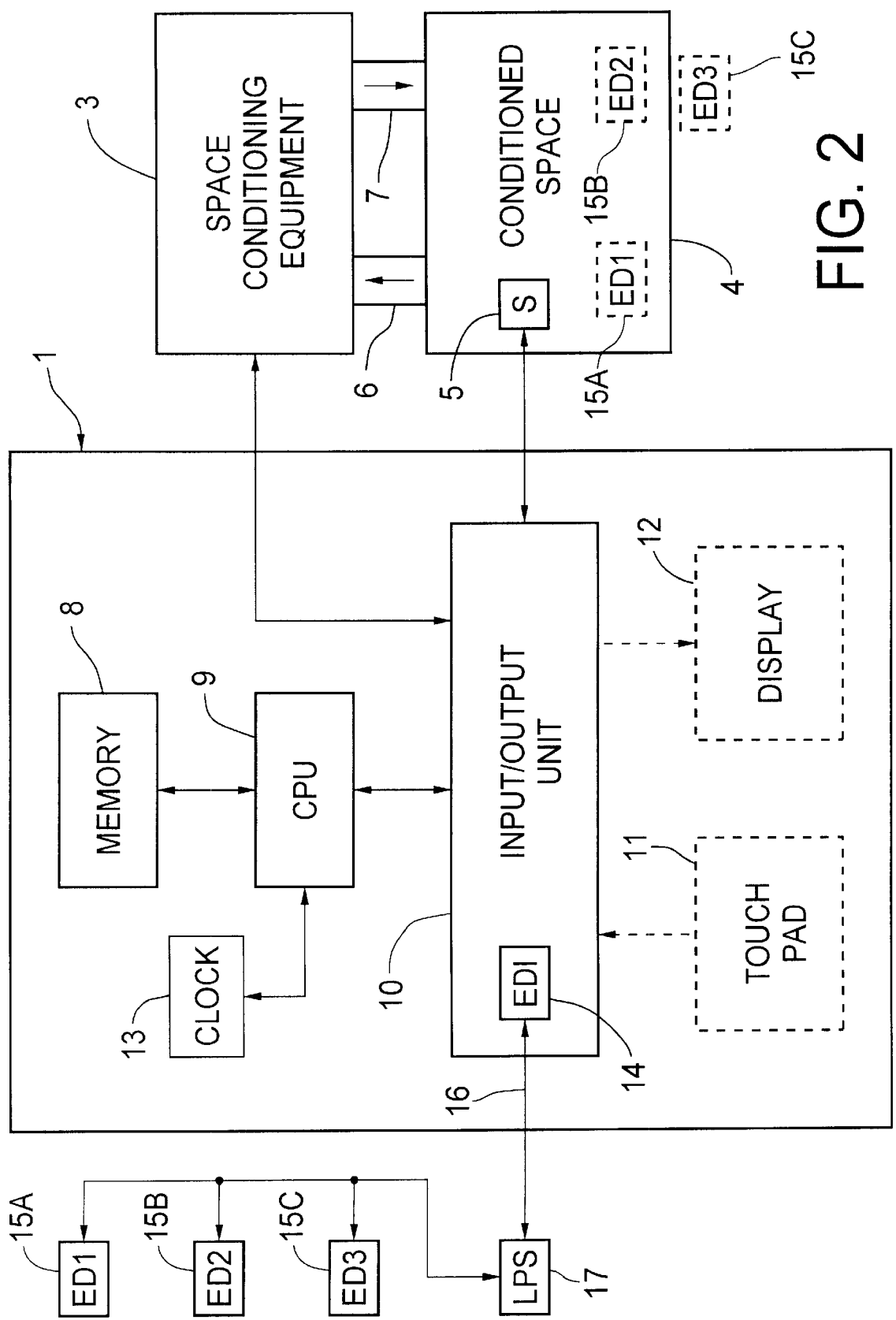
FIG. 2 is a block diagram of a second embodiment of a thermostat system employing the present invention.

Consider now the various configurations for practicing the invention. In the basic configuration of FIG. 1, all the electrical devices 15A–15N may be directly coupled to the electrical device interface 14 of the processor 1 by serial link 16; a dedicated wire set in the example. However, a more practical configuration is shown in FIG. 2 in which the electrical device interface 14 is coupled to the local power system 17 such that communication to the electrical devices 15A–15N is via the local power system using, for example, the X10 protocol. Thus, FIG. 2 represents a first presently preferred embodiment of the invention.

Figure 3:
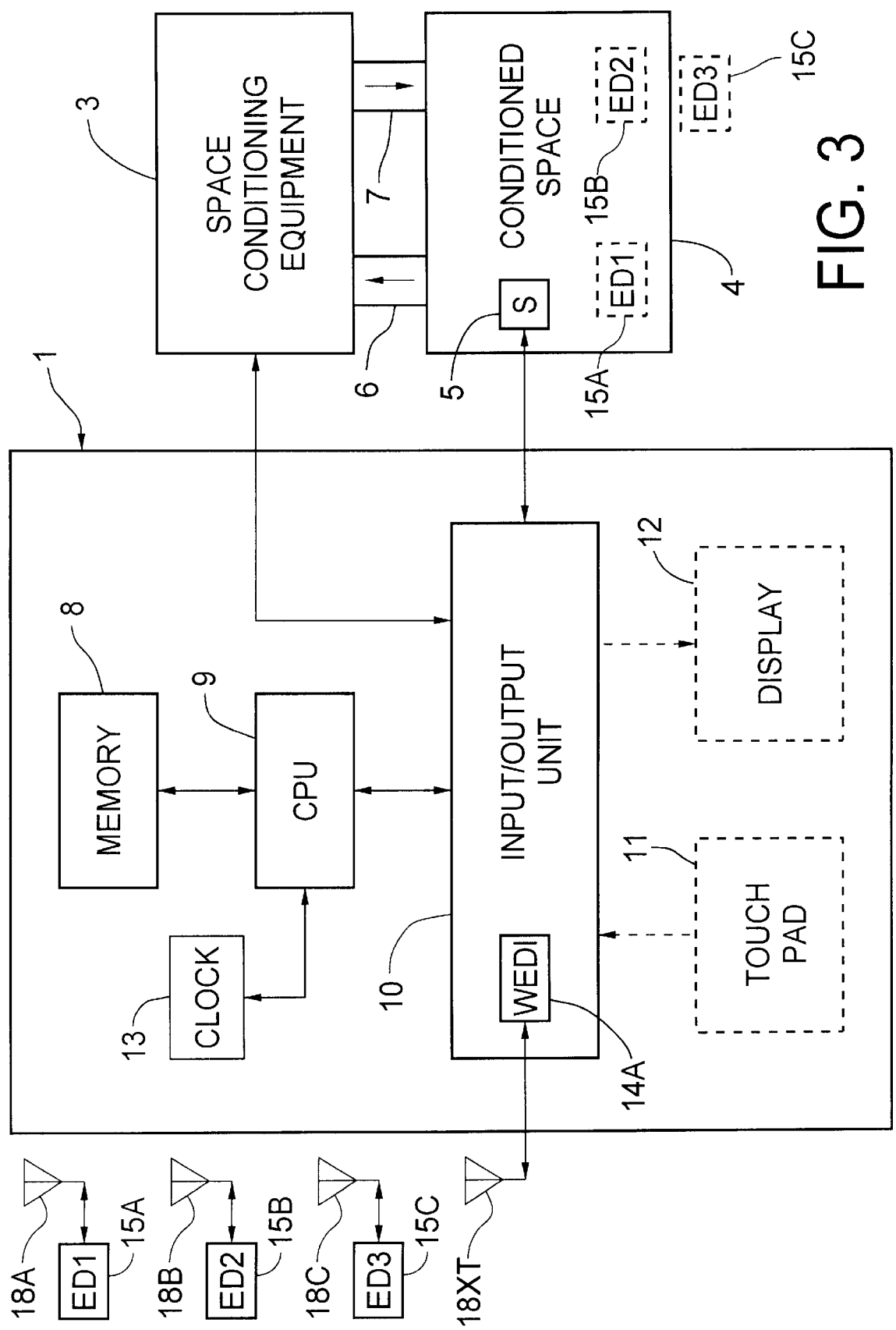
FIG. 3 is a block diagram of a third embodiment of a thermostat system employing the present invention.

FIG. 3 shows an embodiment of the invention in which the electrical device interface 14A provides a very low power radio frequency signal carrying device commands to a transmitting antenna 18XT. The exemplary controlled electrical devices 15A–15C are each provided with a receiving antenna 18A–18C and include conventional demodulation circuitry for sensing the transmitted commands and responding thereto if addressed.

Figure 4:
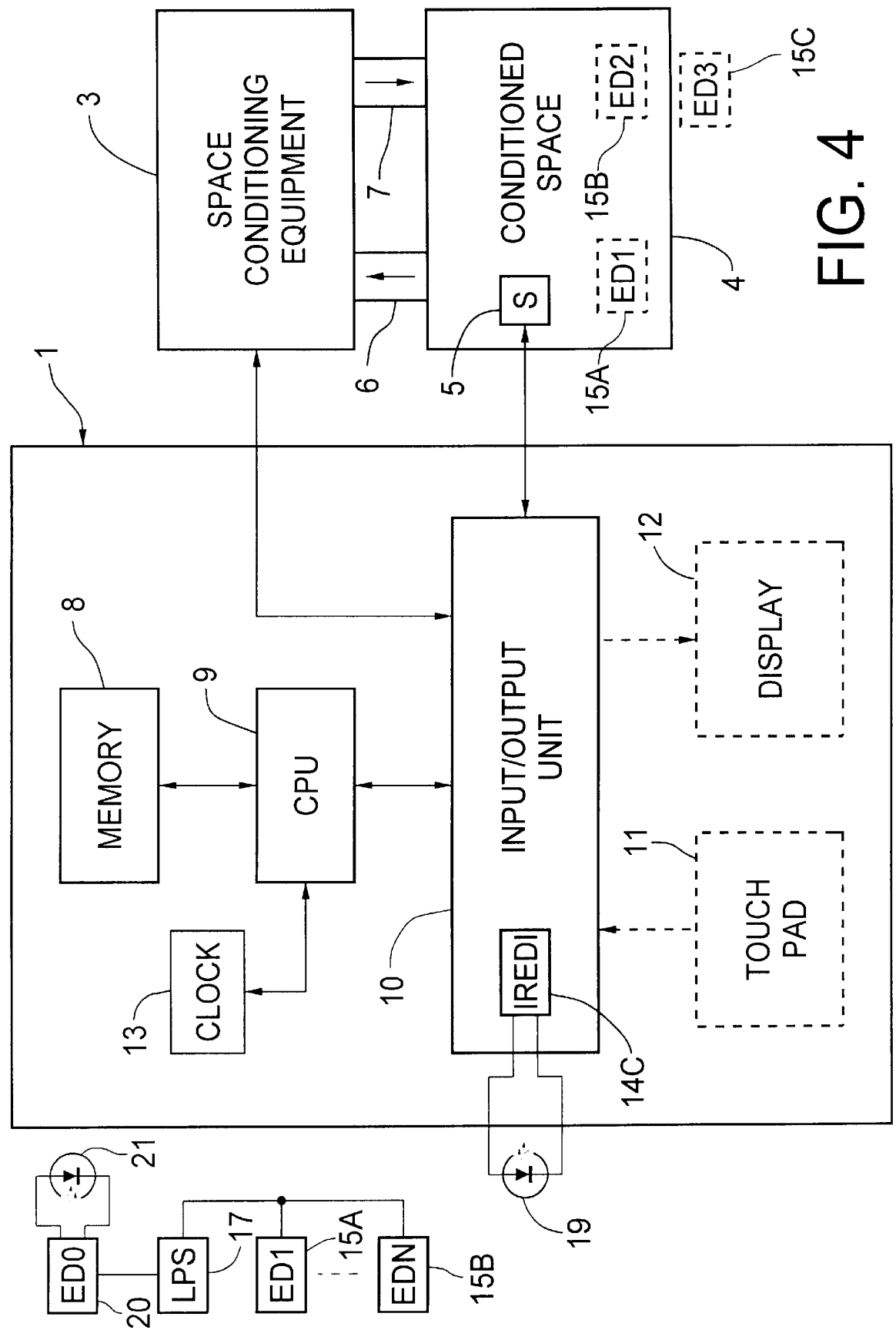
FIG. 4 is a block diagram of a fourth embodiment of a thermostat system employing the present invention.

FIG. 4 shows a second preferred embodiment of the invention which takes advantage of known X10 protocol devices available off-the-shelf. In this configuration, the electrical device interface 14B pulses commands to a source of infrared light such as IRLED 19. Within the line of sight of IRLED 19, there is placed an X10 controller ED0 20 which includes an IR photocell 21 for receiving command pulses from the IRLED 19. (Such X10 controllers 20 are widely available and are used to permit the use of small "remotes" for user convenience in a given X10 system.) Thus, commands sent from the processor 1 are intercepted by the controller 20 which transfers the commands to the local power system 17 for transmission to the controlled electrical devices ED1 15A–EDN 15N as described for the embodiment of the invention shown in FIG. 2.

As previously mentioned, the panel 22 shown in FIG. 5 is for illustrative purposes only. However, reference may be taken to my copending application Ser. No. 10/060,768, filed Jan. 30, 2002, entitled PROGRAMMABLE THERMOSTAT SYSTEM EMPLOYING A TOUCH SCREEN UNIT FOR INTUITIVE INTERACTIVE INTERFACE WITH A USER, incorporated by reference herein, for disclosure of a thermostat system having an integrated touch pad/LCD user interface unit which can readily generate a screen providing all the features of FIG. 5 and extensions for more choices as may be appropriate in a commercial embodiment.

While the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. A thermostat system for controlling space conditioning equipment comprising:
   A) a temperature sensor for providing an electrical signal indicative of the temperature of a conditioned space in which the temperature sensor is situated;
   B) a processor, said processor including:
      1) a central processing unit;
      2) a memory coupled to said central processing unit for storing program and data information; and
      3) an input/output unit including:
         a) a sensor input coupled to said temperature sensor for receiving said electrical signal therefrom;
         b) a control output coupled to the space conditioning equipment for issuing control signals thereto; and
         c) an electrical device interface adapted to establish communications between said processor and a plurality of addressable electrical devices for selective actuation and deactuation thereof; said addressable electrical devices being situated within and proximate said conditioned space; and
   C) a program stored in said memory for causing said central processing unit to selectively:
      1) place said thermostat system into a "vacation" mode; and
      2) if said thermostat system is in said "vacation" mode, periodically actuate and deactuate predetermined ones of said addressable electrical devices in a predetermined pattern.

2. The thermostat system of claim 1 which further includes manual-input means and display means for interactive interface with a user and in which said program, in a programming mode:
   A) selectively shows, on said display, choices to a user for setting up said predetermined pattern by touching said manual-input means in a predetermined sequence; and
   B) reads the predetermined sequence of touches on said manual input means in order to establish said predetermined pattern.

3. The thermostat system of claim 1 in which said electrical device interface and said electrical devices are coupled to the local line power system of said conditioned space such that said local line power system transfers control signals therebetween.

4. The thermostat system of claim 2 in which said electrical device interface and said electrical devices are coupled to the local line power system of said conditioned space such that said local line power system transfers control signals therebetween.

5. The thermostat system of claim 3 in which said electrical device interface and said electrical devices communicate over said local line power system employing the X10 protocol.

6. The thermostat system of claim 4 in which said electrical device interface and said electrical devices communicate over said local line power system employing the X10 protocol.

7. The thermostat of claim 1 in which said electrical devices are a wireless control type and said electrical device interface communicates wirelessly therewith.

8. The thermostat of claim 2 in which said electrical devices are a wireless control type and said electrical device interface communicates wirelessly therewith.

9. The thermostat system of claim 7 in which said electrical device interface and said electrical devices communicate wirelessly employing the X10 protocol.

10. The thermostat system of claim 8 in which said electrical device interface and said electrical devices communicate wirelessly employing the X10 protocol.

11. The thermostat system of claim 1 in which said electrical device interface and said electrical devices are coupled via at least one modality selected from the group which includes:
   A) the localline power system of said conditioned space;
   B) wireless; and
   C) infrared.

12. The thermostat system of claim 2 in which said electrical device interface and said electrical devices are coupled via at least one modality selected from the group which includes:
   A) the local line power system of said conditioned space;
   B) wireless; and
   C) infrared.

13. The thermostat system of claim 11 in which said electrical device interface and said electrical devices communicate employing the X10 protocol.

14. The thermostat system of claim 12 in which said electrical device interface and said electrical devices communicate employing the X10 protocol.

15. A thermostat system for supervising space conditioning equipment for a conditioned space, said thermostat system having a vacation mode of operation in which the appearance of the conditioned space is periodically changed to provide the illusion of ongoing occupancy, said thermostat system comprising:

A) a temperature sensor for providing an electrical signal indicative of the temperature of a conditioned space in which the temperature sensor is situated;

B) a plurality of addressable electrical devices situated about the conditioned space, said electrical devices being coupled to the local line power system of the conditioned space for receiving digital commands placed on the local line power system;

C) an infrared electrical device controller coupled to the local line power system of the conditioned space for selectively placing digital electrical device commands thereon, said infrared electrical device controller being adapted to receive digital electrical device commands transmitted in infrared and resend the commands via the local line power system of the conditioned space to said addressable electrical devices;

D) a processor, said processor including:
1) a central processing unit;
2) a memory coupled to said central processing unit for storing program and data information; and
3) an input/output unit including:
   a) a sensor input coupled to said temperature sensor for receiving said electrical signal therefrom;
   b) a control output coupled to the space conditioning equipment for issuing control signals thereto; and
   c) an infrared electrical device interface adapted to, under control of said central processing unit, selectively transmit electrical device commands to said infrared controller via infrared for selective actuation and deactuation of said addressable electrical devices; and E) a program stored in said memory for causing said central processing unit to selectively:
1) place said thermostat system into a "vacation" mode; and
2) if said thermostat system is in said "vacation" mode, periodically actuate and deactuate predetermined ones of said addressable electrical devices in a predetermined pattern.

* * * * *